United States Patent
Lee et al.

(10) Patent No.: US 9,928,090 B2
(45) Date of Patent: Mar. 27, 2018

(54) METHOD FOR PROCESSING DYNAMIC LANGUAGE AND ELECTRONIC DEVICE USING THE SAME

(71) Applicant: Samsung Electronics Co., Ltd., Gyeonggi-do (KR)

(72) Inventors: Kwangbin Lee, Gyeonggi-do (KR); Hojong Han, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 15/139,929

(22) Filed: Apr. 27, 2016

(65) Prior Publication Data
US 2016/0314006 A1    Oct. 27, 2016

(30) Foreign Application Priority Data
Apr. 27, 2015  (KR) .................. 10-2015-0058995

(51) Int. Cl.
*G06F 9/45* (2006.01)
*G06F 9/455* (2018.01)

(52) U.S. Cl.
CPC ...... *G06F 9/45529* (2013.01); *G06F 9/45516* (2013.01)

(58) Field of Classification Search
None
See application file for complete search history.

(56) References Cited

U.S. PATENT DOCUMENTS

| | | | | |
|---|---|---|---|---|
| 6,233,730 B1* | 5/2001 | Todd | .................... | G06F 9/4428 717/108 |
| 6,725,450 B1* | 4/2004 | Takayama | ............... | G06F 8/443 717/136 |
| 8,516,360 B2 | 8/2013 | Mondal et al. | | |
| 2005/0177821 A1* | 8/2005 | Ogata | ................. | G06F 11/3636 717/148 |
| 2007/0240105 A1* | 10/2007 | Herrmann | ................ | G06F 8/30 717/106 |
| 2009/0113386 A1* | 4/2009 | Eker | ......................... | G06F 8/68 717/108 |
| 2011/0283270 A1* | 11/2011 | Gass | ......................... | G06F 8/71 717/168 |
| 2013/0055063 A1* | 2/2013 | Mondal | ................. | G06F 9/4552 715/234 |
| 2013/0103973 A1* | 4/2013 | Werth | ................... | G06F 9/4446 714/2 |
| 2015/0128118 A1* | 5/2015 | Skoglund | ................. | G06F 8/54 717/162 |

* cited by examiner

*Primary Examiner* — Chameli Das
(74) *Attorney, Agent, or Firm* — The Farrell Law Firm, P.C.

(57) ABSTRACT

Methods and apparatuses are provided for processing a dynamic language application in an electronic device. A first machine code is generated using a first processor and a second machine code is generated using a second processor, for the dynamic language application. The dynamic language application is processed by executing the first machine code. The first machine code is replaced with the second machine code. Processing of the dynamic language application is continued by executing the second machine code.

10 Claims, 9 Drawing Sheets

METHOD FOR PROCESSING DYNAMIC LANGUAGE AND ELECTRONIC DEVICE USING THE SAME

PRIORITY

This application claims priority under 35 U.S.C. § 119(a) to Korean Patent Application No. 10-2015-0058995, filed in the Korean Intellectual Property Office on Apr. 27, 2015, the content of which is incorporated herein by reference.

BACKGROUND

1. Field of the Disclosure

The present disclosure relates generally to dynamic language application processing, and more particularly, to a method for processing a dynamic language application using multiple dynamic language codes, and an electronic device using the same, in a multiprocessor environment.

2. Description of the Related Art

With recent advances in the processor technology, single-core processors have evolved into multicore processors. In a multicore processor, different tasks may be processed by different cores. Hence, an electronic device, such as, for example, a mobile terminal employing a multicore processor, may improve task processing performance.

An electronic device, or a mobile terminal, may use JAVASCRIPT® to represent a dynamic webpage in a browser.

JAVASCRIPT® is a procedural language having a context, and thus, it may be difficult to apply parallel processing to JAVASCRIPT® code. JAVASCRIPT® is also a dynamic type language, and thus, it is possible to improve execution performance by generating machine code, such as just-in-time (JIT) code. However, technology for improving execution performance of dynamic languages in a multiprocessor environment is underdeveloped. For example, in the case of JAVASCRIPT®, use of a multiprocessor is limited to JAVASCRIPT® code with different contexts.

To execute source code in a dynamic language, the electronic device may compile the source code into a first machine code under the assumption of a first type (e.g., an integer). The electronic device may detect a failure in the code during execution of the first machine code. The failure may be caused by inappropriate type inference or assumptions made during compilation (i.e., the first machine code of the first type is not suitable for execution). In the case of failure, a bailout occurs. When a bailout occurs during execution, the electronic device may compile the source code into second machine code under the assumption of a second type (e.g. float), and may execute the second machine code.

Consequently, when a bailout occurs during execution of dynamic language code, additional time may be needed to generate a new machine code of a different type.

In the case of dynamic language code, a high-quality machine code may increase the execution speed of the code. However, the high-quality machine code may require a longer generation time (compile time).

SUMMARY

The present disclosure has been made to address at least the above problems and/or disadvantages and to provide at least the advantages described below. Accordingly, an aspect of the present disclosure provides a method for processing a dynamic language application using multiple dynamic language codes, and an electronic device using the same, in a multiprocessor environment.

In accordance with an aspect of the present disclosure, a method is provided for processing a dynamic language application in an electronic device. A first machine code is generated using a first processor and a second machine code is generated using a second processor, for the dynamic language application. The dynamic language application is processed by executing the first machine code. The first machine code is replaced with the second machine code. The dynamic language application is continuously processed by executing the second machine code.

In accordance with another aspect of the present disclosure, an electronic device is provided that includes a machine code assignment module, a machine code replacement module, a dynamic language execution module, and a plurality of processors electrically connected with the machine code assignment module, the machine code replacement module, and the dynamic language execution module. The electronic device also includes a memory that stores instructions that are configured to, when executed for a dynamic language application, cause the electronic device to generate a first machine code using a first processor of the plurality of processors, generate a second machine code using a second processor of the plurality of processors, process the dynamic language application by executing the first machine code, replace the first machine code with the second machine code, and continuously processing the dynamic language application by executing the second machine code.

BRIEF DESCRIPTION OF THE DRAWINGS

The above and other aspects, features, and advantages of embodiments of the present disclosure will be more apparent from the following detailed description when taken in conjunction with the accompanying drawings, in which.

DETAILED DESCRIPTION

Figure 1:
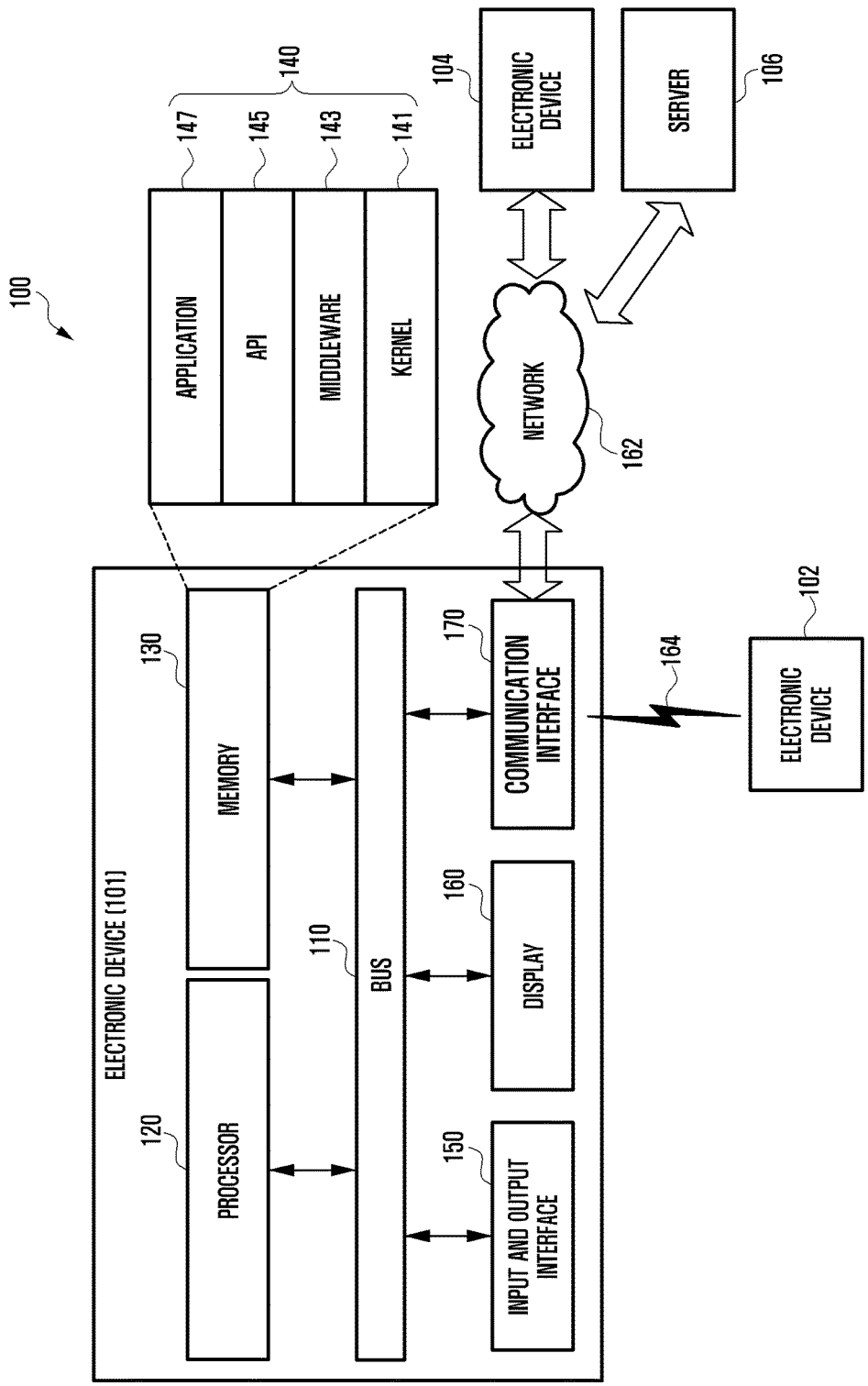
FIG. 1 is a diagram illustrating a network environment including electronic devices, according to an embodiment of the present disclosure.

Embodiments of the present disclosure are described in detail with reference to the accompanying drawings. The same or similar components may be designated by the same or similar reference numerals although they are illustrated in different drawings. Detailed descriptions of constructions or processes known in the art may be omitted to avoid obscuring the subject matter of the present disclosure.

The expressions "comprising" and "may comprise", as used herein, indicate the presence of a corresponding function, operation, or element, and do not limit additional at least one function, operation, or element. Further, the terms "comprise" and "have" indicate the presence of a characteristic, numeral, step, operation, element, component, or combination thereof, described herein, and do not exclude the presence or addition of at least one other characteristic, numeral, step, operation, element, component, or combination thereof.

Herein, the expression "or" includes any combination or the entire combination of together listed words. For example, "A or B" may include A, B, or A and B.

The expressions "first" and "second", as used herein, may represent various elements of the present disclosure, but do not limit corresponding elements. For example, the expressions do not limit the order and/or importance of corresponding elements. The expressions may be used to distinguish one element from another element. For example, both a first user device and a second user device are user devices and represent different user devices. Additionally, a first constituent element may be referred to as a second constituent element without deviating from the scope of the present disclosure, and similarly, a second constituent element may be referred to as a first constituent element.

When it is described that an element is "coupled" to another element, the element may be "directly coupled" to the other element or "electrically coupled" to the other element through a third element. However, when it is described that an element is "directly coupled" to another element, no element may exist between the element and the other element.

Terms used herein do not limit the present disclosure but instead are used to illustrate the embodiments. A singular form of a term includes a plurality of forms unless it is explicitly differently represented.

Unless differently defined, entire terms, including technical and scientific terms, used herein have the same meanings as those that may be generally understood by a person of common skill in the art. Generally used terms defined in a dictionary have meanings corresponding to that of a context of related technology, and are not analyzed in an ideal or excessively formal meaning unless explicitly defined.

Herein, an electronic device may involve a communication function. For example, an electronic device may be embodied as a smart phone, a tablet personal computer (PC), a mobile phone, a video phone, an e-book reader, a desktop PC, a laptop PC, a netbook computer, a personal digital assistant (PDA), a portable multimedia player (PMP), an MP3 player, a portable medical device, a digital camera, or a wearable device (e.g., a head-mounted device (HMD) such as electronic glasses, electronic clothes, an electronic bracelet, an electronic necklace, an electronic appcessory, or a smart watch).

According to embodiments of the present disclosure, an electronic device may be embodied as a smart home appliance that involves a communication function. For example, an electronic device may be a television (TV), a digital versatile disc (DVD) player, audio equipment, a refrigerator, an air conditioner, a vacuum cleaner, an oven, a microwave, a washing machine, an air cleaner, a set-top box, a TV box, a game console, an electronic dictionary, an electronic key, a camcorder, or an electronic picture frame.

According to embodiments of the present disclosure, an electronic device may be embodied as a medical device (e.g., magnetic resonance angiography (MRA), a magnetic resonance imaging (MRI), computed tomography (CT), ultrasonography, etc.), a navigation device, a global positioning system (GPS) receiver, an event data recorder (EDR), a flight data recorder (FDR), a car infotainment device, electronic equipment for ship (e.g., a marine navigation system, a gyrocompass, etc.), avionics, security equipment, or an industrial or home robot.

According to embodiments of the present disclosure, an electronic device may be embodied as furniture or part of a building or construction having a communication function, an electronic board, an electronic signature receiving device, a projector, or various measuring instruments (e.g., a water meter, an electric meter, a gas meter, a wave meter, etc.). An electronic device, as described herein, may be one of the above-described devices or any combination thereof. As well understood by those skilled in the art, the above-described electronic devices are merely examples and are not to be considered as a limitation of this disclosure.

FIG. 1 is a block diagram illustrating an electronic device, according to an embodiment of the present disclosure.

Referring to FIG. 1, an electronic device 101 includes a bus 110, a processor 120, a memory 130, a user input module 150, a display 160, and a communication interface 170.

The bus 110 may be a circuit for interconnecting elements described above and for allowing a communication (e.g., by transferring a control message), between the elements described above.

The processor 120 can receive commands from the above-described other elements (e.g., the memory 130, the user input module 150, the display 160, and the communication interface 170), through, for example, the bus 110, can decipher the received commands, and perform operations and/or data processing according to the deciphered commands.

The memory 130 can store commands received from the processor 120 and/or other elements (e.g., the user input module 150, the display 160, and the communication interface 170), and/or commands and/or data generated by the processor 120 and/or other elements. The memory 130 includes software and/or programs 140 that include a kernel 141, middleware 143, an application programming interface (API) 145, and an application 147. Each of the programming modules described above may be configured by software, firmware, hardware, and/or combinations of two or more thereof.

The kernel 141 can control and/or manage system resources (e.g., the bus 110, the processor 120 or the memory 130), used for execution of operations and/or functions implemented in other programming modules, such as, for example, the middleware 143, the API 145, and/or the application 147. Further, the kernel 141 can provide an interface through which the middleware 143, the API 145, and/or the application 147 can access and then control and/or manage an individual element of the electronic device 101.

The middleware 143 can perform a relay function which allows the API 145 and/or the application 147 to communicate with and exchange data with the kernel 141. Further, in relation to operation requests received from the at least one application 147, the middleware 143 can perform load balancing in relation to the operation requests by, for example, giving a priority in using a system resource (e.g., the bus 110, the processor 120, and/or the memory 130) of the electronic device 101 to at least one application from among the at least one application 147.

The API 145 is an interface through which the application 147 can control a function provided by the kernel 141 and/or the middleware 143, and may include, for example, at least one interface or function for file control, window control, image processing, and/or character control.

The input and output interface 150 can receive, for example, a command and/or data from a user, and transfer the received command and/or data to the processor 120 and/or the memory 130 through the bus 110. The display 160 can display an image, a video, and/or data to a user.

The communication interface 170 can establish communication between the electronic device 101 and another electronic device (e.g., first external electronic device 102 or second external electronic device 104) and/or a server 164. The communication interface 170 can support short range communication protocols such as, for example, a WiFi protocol, a BlueTooth (BT) protocol, and a near field communication (NFC) protocol, communication networks (e.g., the Internet, a local area network (LAN), a wide area network (WAN), a telecommunication network, a cellular network, and a satellite network), or a plain old telephone service (POTS), or any other similar and/or suitable communication networks, such as network 162, or the like. Each of the first and second external electronic devices 102 and 104 may be of a same type and/or different types of electronic device.

Figure 2:
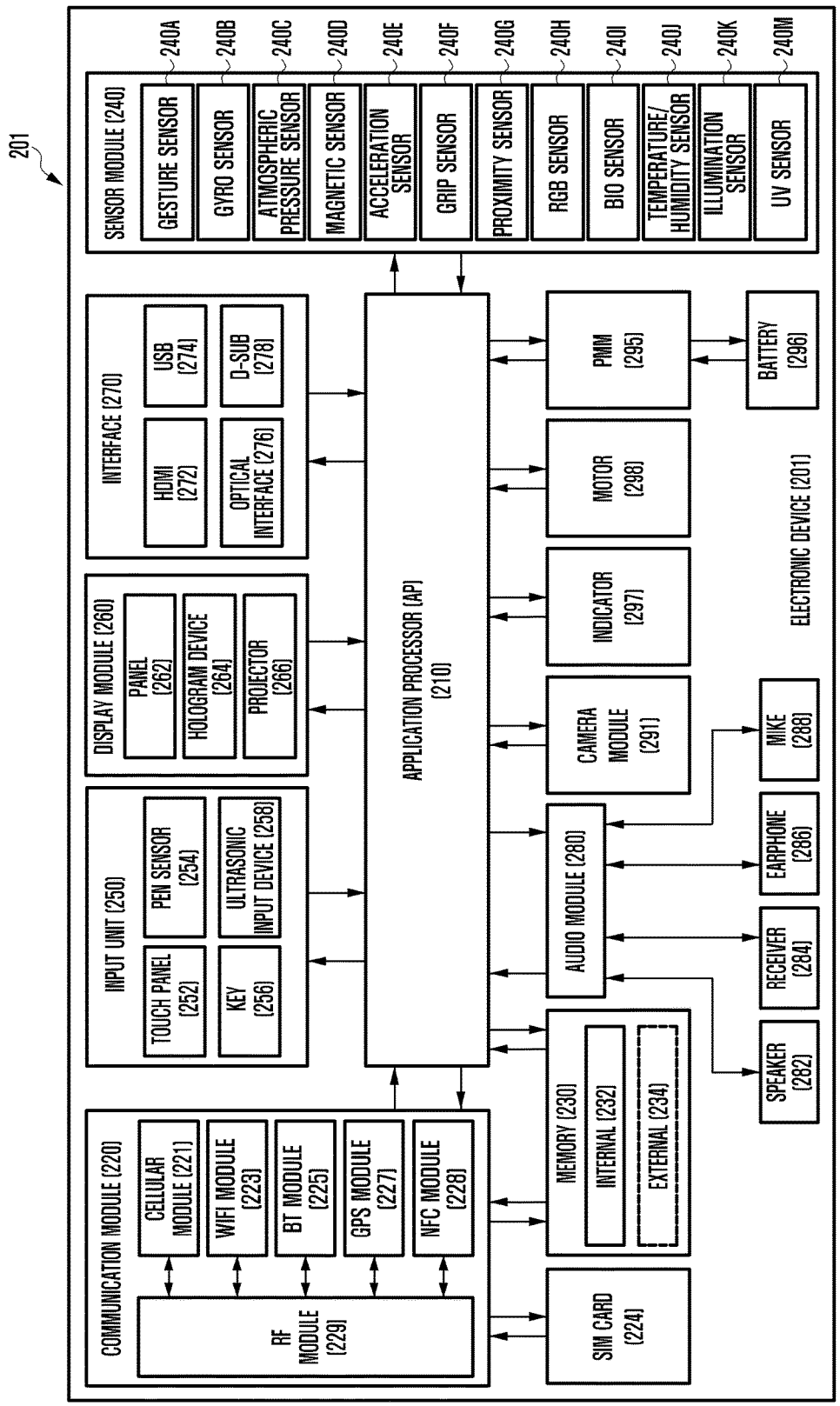
FIG. 2 is a block diagram illustrating an electronic device, according to an embodiment of the present, disclosure.

FIG. 2 is a block diagram illustrating an electronic device, according to an embodiment of the present disclosure. An electronic device 201 may form, for example, the whole or part of the electronic device 101 of FIG. 1. Referring to FIG. 2, the electronic device 201 includes at least one application processor (AP) 210, a communication module 220, a subscriber identification module (SIM) card 224, a memory 230, a sensor module 240, an input unit 250, a display module 260, an interface 270, an audio module 280, a camera module 291, a power management module (PMM) 295, a battery 296, an indicator 297, and a motor 298.

The AP 210 may drive an operating system or applications, control a plurality of hardware or software components connected thereto, and also perform processing and operation for various data, including, for example, multimedia data. The AP 210 may be formed of a system-on-chip (SoC), for example. According to an embodiment of the present disclosure, the AP 210 may further include a graphic processing unit (GPU).

The communication module 220 (e.g., the communication interface 160 of FIG. 1) may perform data communication with any other electronic device (e.g., the second external electronic device 104 or the server 106 of FIG. 1) connected to the electronic device 200 (e.g., the electronic device 101 of FIG. 1) through the network. According to an embodiment of the present disclosure, the communication module 220 may include therein a cellular module 221, a WiFi module 223, a BT module 225, a GPS module 227, an NFC module 228, and a radio frequency (RF) module 229.

The cellular module 221 may offer a voice call, a video call, a message service, an internet service, or the like through a communication network (e.g., long term evolution (LTE), LTE-advanced (LTE-A), code division multiple access (CDMA), wideband code division multiple access (WCDMA), universal mobile telecommunications system (UMTS), wireless broadband (WiBro), or global system for mobile communication (GSM), etc.). Additionally, the cellular module 221 may perform identification and authentication of the electronic device in the communication network, using the SIM card 224. According to an embodiment of the present disclosure, the cellular module 221 may perform at least part of the functions that the AP 210 can provide. For example, the cellular module 221 may perform at least part of a multimedia control function.

According to an embodiment of the present disclosure, the cellular module 221 may include a communication processor (CP). Additionally, the cellular module 221 may be formed of an SoC, for example. Although some elements, such as the cellular module 221 (e.g., the CP), the memory 230, or the power management module 295, are shown as elements that are separate and different from the AP 210 in FIG. 2, the AP 210 may be formed to have at least part (e.g., the cellular module 221) of the above elements in an embodiment of the present disclosure.

According to an embodiment of the present disclosure, the AP 210 or the cellular module 221 (e.g., the CP) may load commands or data, received from a nonvolatile memory connected thereto or from at least one of the other elements, into a volatile memory to process them. Additionally, the AP 210 or the cellular module 221 may store data, received from, or created at one or more of the other elements, in the nonvolatile memory.

Each of the WiFi module 223, the BT module 225, the GPS module 227 and the NFC module 228 may include a processor for processing data transmitted or received therethrough. Although FIG. 2 shows the cellular module 221, the WiFi module 223, the BT module 225, the GPS module 227 and the NFC module 228 as different blocks, at least part of them may be contained in a single integrated circuit (IC) chip or a single IC package. For example, at least part (e.g., the CP corresponding to the cellular module 221 and a WiFi processor corresponding to the WiFi module 223) of respective processors corresponding to the cellular module 221, the WiFi module 223, the BT module 225, the GPS module 227 and the NFC module 228 may be formed as a single SoC.

The RF module 229 may transmit and receive data, e.g., RF signals or any other electric signals. The RF module 229 may include a transceiver, a power amp module (PAM), a frequency filter, a low noise amplifier (LNA), or the like. Also, the RF module 229 may include any component, e.g., a wire or a conductor, for transmission of electromagnetic waves in a free air space. Although FIG. 2 shows that the cellular module 221, the WiFi module 223, the BT module 225, the GPS module 227 and the NFC module 228 share the RF module 229, at least one of them may perform transmission and reception of RF signals through a separate RF module.

The SIM card 224 may be a specific card formed of SIM and may be inserted into a slot formed at a certain place of the electronic device. The SIM card 224 may contain therein an integrated circuit card identifier (ICCID) or an international mobile subscriber identity (IMSI).

The memory 230 (e.g., the memory 130 of FIG. 1) may include an internal memory 232 and an external memory 234. The internal memory 232 may include, for example, at least one of a volatile memory (e.g., dynamic random access memory (DRAM), static RAM (SRAM), synchronous DRAM (SDRAM), etc.) or a nonvolatile memory (e.g., programmable read only memory (PROM), erasable and PROM (EPROM), electrically EPROM (EEPROM), one-time PROM (OTPROM), mask ROM, flash ROM, NAND flash memory, NOR flash memory, etc.).

According to an embodiment of the present disclosure, the internal memory 232 may have the form of a solid state drive (SSD). The external memory 234 may include a flash drive, e.g., compact flash (CF), secure digital (SD), Micro-SD, Mini-SD, extreme digital (xD), memory stick, or the like. The external memory 234 may be functionally connected to the electronic device 200 through various interfaces. According to an embodiment of the present disclosure, the electronic device 200 may further include a storage device or medium such as, for example, a hard drive.

The sensor module 240 may measure a physical quantity or sense an operating status of the electronic device 200, and then convert the measured or sensed information into electric signals. The sensor module 240, includes, for example, at least one of a gesture sensor 240A, a gyro sensor 240B, an atmospheric sensor 240C, a magnetic sensor 240D, an acceleration sensor 240E, a grip sensor 240F, a proximity sensor 240G, a color sensor 240H (e.g., red, green, blue (RGB) sensor), a biometric sensor 240I, a temperature-humidity sensor 240J, an illumination sensor 240K, and an ultraviolet (UV) sensor 240M. Additionally or alternatively, the sensor module 240 may include, e.g., an E-nose sensor, an electromyography (EMG) sensor, an electroencephalogram (EEG) sensor, an electrocardiogram (ECG) sensor, an infrared (IR) sensor, an iris scan sensor, or a finger scan sensor. Also, the sensor module 240 may include a control circuit for controlling one or more sensors equipped therein.

The input unit 250 includes at least one of a (touch panel 252, a digital pen sensor 254, a key 256, or an ultrasonic input unit 258. The touch panel 252 may recognize a touch input in a manner of capacitive type, resistive type, infrared type, or ultrasonic type. Also, the touch panel 252 may further include a control circuit. In the case of a capacitive type, a physical contact or proximity may be recognized. The touch panel 252 may further include a tactile layer. In this case, the touch panel 252 may offer tactile feedback to a user.

The digital pen sensor 254 may be formed in the same or similar manner as receiving a touch input or by using a separate recognition sheet. The key 256 may include, for example, a physical button, an optical key, or a keypad. The ultrasonic input unit 258 is a specific device capable of identifying data by sensing sound waves with a microphone 288 in the electronic device 200 through an input tool that generates ultrasonic signals, thus allowing wireless recognition. According to an embodiment of the present disclosure, the electronic device 200 may receive a user input from any external device (e.g., a computer or a server) connected thereto through the communication module 220.

The display module 260 (e.g., the display 150 of FIG. 1) includes at least one of a panel 262, a hologram 264, and a projector 266. The panel 262 may be, for example, liquid crystal display (LCD), active matrix organic light emitting diode (AM-OLED), or the like. The panel 262 may have a flexible, transparent, or wearable form. The panel 262 may be formed of a single module with the touch panel 252. The hologram 264 may show a stereoscopic image in the air using interference of light. The projector 266 may project an image onto a screen, which may be located inside or outside of the electronic device 200. According to an embodiment of the present disclosure, the display 260 may further include a control circuit for controlling the panel 262, the hologram 264, and the projector 266.

The interface 270 includes at least one of a high-definition multimedia interface (HDMI) 272, a universal serial bus (USB) 274, an optical interface 276, and a D-subminiature (D-sub) 278. The interface 270 may be contained, for example, in the communication interface 160 of FIG. 1. Additionally or alternatively, the interface 270 may include, for example, a mobile high-definition link (MHL) interface, a secure digital (SD) card/multi-media card (MMC) interface, or an infrared data association (IrDA) interface.

The audio module 280 may perform a conversion between sounds and electric signals. At least part of the audio module 280 may be contained, for example, in the input/output interface 140 of FIG. 1. The audio module 280 may process sound information inputted or outputted through a speaker 282, a receiver 284, an earphone 286, or the microphone 288.

The camera module 291 is capable of obtaining still images and moving images. According to an embodiment of the present disclosure, the camera module 291 may include at least one image sensor (e.g., a front sensor or a rear sensor), a lens, an image signal processor (ISP), or a flash (e.g., an LED or a xenon lamp).

The power management module 295 may manage electric power of the electronic device 200. The power management module 295 may include, for example, a power management integrated circuit (PMIC), a charger IC, or a battery gauge.

The PMIC may be formed, for example, of an IC chip or SoC. Charging may be performed in a wired or wireless manner. The charger IC may charge a battery 296 and prevent overvoltage or overcurrent from a charger. According to an embodiment of the present disclosure, the charger IC may have a charger IC used for at least one of wired and wireless charging types. A wireless charging type may include, for example, a magnetic resonance type, a magnetic induction type, or an electromagnetic type. Any additional circuit for wireless charging may be used, such as a coil loop, a resonance circuit, or a rectifier.

The battery gauge may measure the residual amount of power in the battery 296 and a voltage, current, or temperature in a charging process. The battery 296 may store or create electric power therein and supply electric power to the electronic device 200. The battery 296 may be, for example, a rechargeable battery or a solar battery.

The indicator 297 may show thereon a current status (e.g., a booting status, a message status, or a recharging status) of the electronic device 200 or of its part (e.g., the AP 210). The motor 298 may convert an electric signal into a mechanical vibration. The electronic device 200 may include a specific processor (e.g., GPU) for supporting a mobile TV. This processor may process media data that complies with standards of digital multimedia broadcasting (DMB), digital video broadcasting (DVB), or media flow.

Each of the above-described elements of the electronic device may be formed of one or more components, and its name may vary according to the type of the 20, electronic device. The electronic device described herein may be formed of at least one of the above-described elements without some elements or with additional elements. Some of the elements may be integrated into a single entity that performs the same functions as those elements before integration.

The term "module", as used herein, may refer to a unit that includes one of hardware, software, firmware, or any combination thereof. The term "module" may be interchangeably used with the terms "unit", "logic", "logical block", "component", or "circuit", for example. A module may be a minimum unit, or part thereof, which performs one or more particular functions. A module may be formed mechanically or electronically. For example, the module disclosed herein may include at least one of application-specific integrated circuit (ASIC) chip, field-programmable gate arrays (FPGAs), and programmable-logic device, which have been known or are to be developed.

Figure 3:
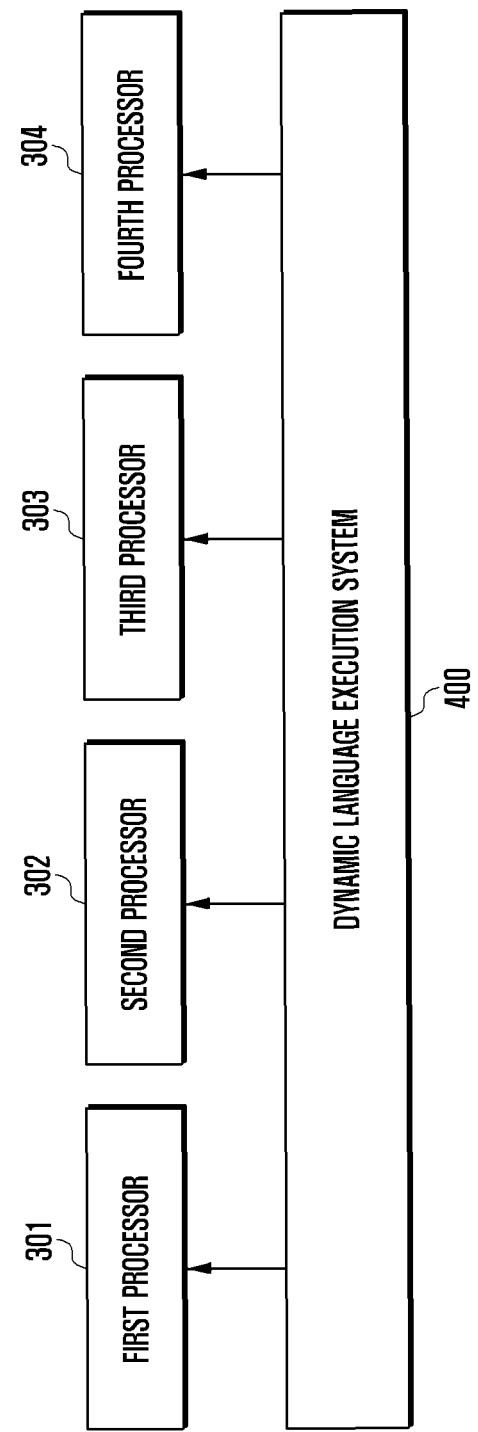
FIG. 3 is a diagram illustrating a configuration of a multiprocessor system of the electronic device, according to an embodiment of the present disclosure.

FIG. 3 is a diagram illustrating a configuration of a multiprocessor system of the electronic device, according to an embodiment of the present disclosure.

Referring to FIG. 3, the multiprocessor system of the electronic device 101 or 201 includes a first processor 301, a second processor 302, a third processor 303, a fourth processor 304, and a dynamic language execution system 400.

According to an embodiment of the present disclosure, a processor includes at least one core, and may be defined as an independent entity capable of cooperating with other components of the electronic device. The processor may use the at least one core to execute instructions of a task. The processor configuration shown in FIG. 3 is for illustration purposes only, and the present disclosure is not limited to such a four processor configuration.

According to an embodiment of the present disclosure, a task may refer to an executable job with a separate program section (e.g. code, variable, stack, or the like). A task may respond to a user request. For example, a task may correspond to a job of compiling source code into machine code, and another task may correspond to a job of executing machine code of a dynamic language application.

Figure 4:
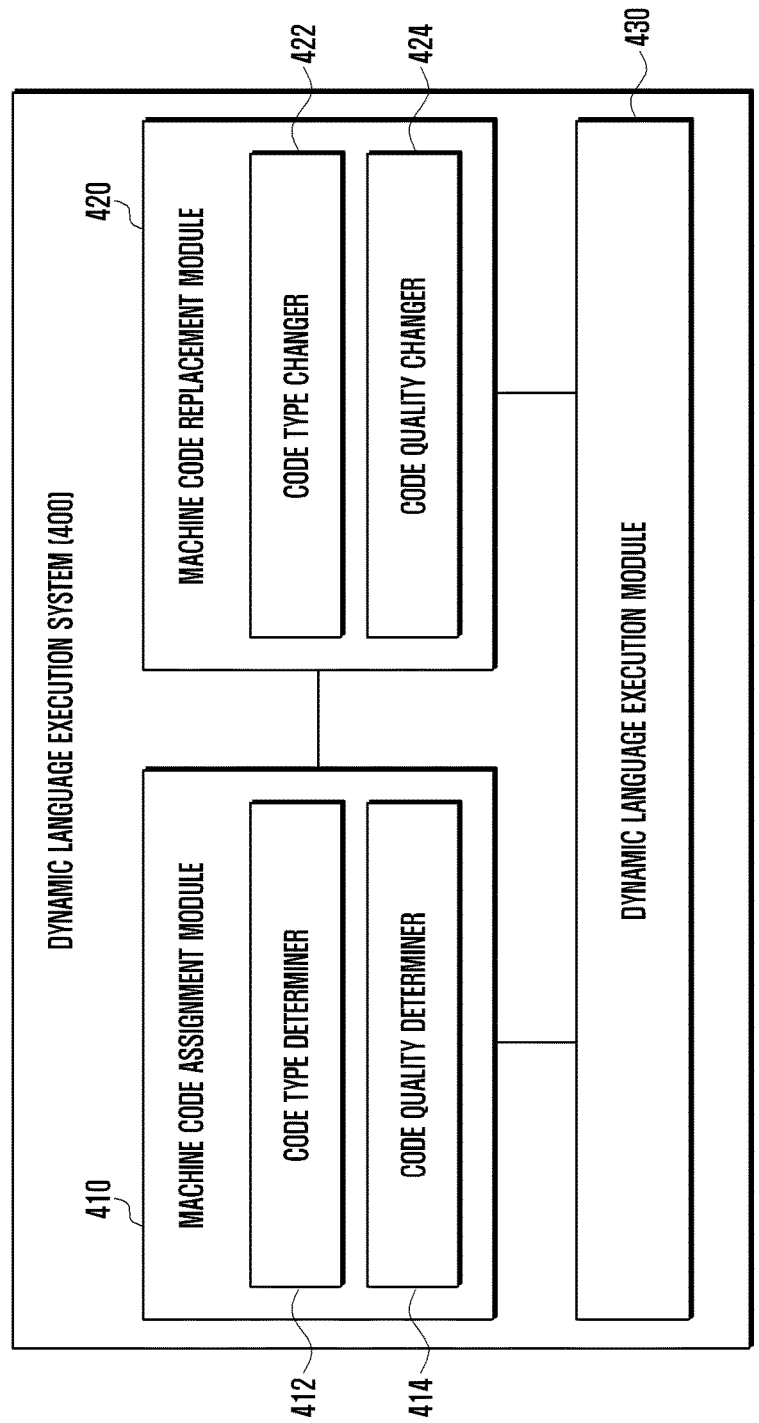
FIG. 4 is a diagram illustrating a configuration of a dynamic language execution system of the electronic device, according to an embodiment of the present disclosure.

FIG. 4 is a diagram illustrating a configuration of a dynamic language execution system of the electronic device, according to an embodiment of the present disclosure.

Referring to FIG. 4, a dynamic language execution system 400 includes a machine code assignment module 410, a machine code replacement module 420, and a dynamic language execution module 430. The dynamic language execution system 400 may compile dynamic language source code into machine code and execute the machine code. The machine code assignment module 410 may include at least one component or module according to factors affecting machine code (binary executable) generated from source code through compilation. For example, if the factors affecting machine code are the type and quality, the machine code assignment module 410 includes a code type determiner 412 and a code quality determiner 414. The machine code assignment module 410 may assign tasks of generating different versions of machine code to different processors (e.g., the first processor 301 and the second processor 302). That is, the machine code assignment module 410 may cause different processors to generate different versions of machine code according to at least one of the type and quality of machine code.

The code type determiner 412 may determine the type of a machine code version to be generated. Machine code may have one of various types such as integer, float, and string.

The code type determiner 412 may determine the type of machine code by inferring the type of operands in the source code. In the case of a dynamic language, since the type of a variable is not fixed, it is necessary to identify the type of an operand whenever the corresponding operation is performed and utilize a version of machine code matching the type for execution. If there is no machine code version matching the type, the source code may be compiled into a new version of machine code matching the type and execution can be performed using the new machine code version. In this case, since a time is needed to compile the source code in consideration of the operand type, it is possible to selectively generate a version of machine code through operand type inference by use of an idle processor. Thereby, it is possible to speed-up the execution of a dynamic language application.

The code type determiner 412 may assign tasks of generating machine code versions with different types to different processors based on inferred machine code types. For example, the code type determiner 412 may assign a task of generating a machine code version of integer type to the first processor 301, and assign a task of generating a machine code version of float type to the second processor 302.

The code quality determiner 414 may determine the quality of machine code to be generated. Versions of machine code may have various levels of quality according to the level of optimization. High-quality (highly optimized) machine code may exhibit a shorter execution time. Poorly optimized machine code may exhibit a shorter compile time, and highly optimized machine code may exhibit a longer compile time.

The code quality determiner 414 may assign tasks of generating machine code versions with different quality levels to different processors. For example, the code type determiner 412 may assign a task of generating a machine code version of a first quality (e.g., 25 percent optimization) to the first processor 301, and assign a task of generating a machine code version of a second quality (e.g., 50 percent optimization) to the second processor 302. Here, since the machine code version of the second quality is more highly optimized than that of the first quality, the machine code version of the second quality may take a longer in translation time.

The machine code replacement module 420 includes a code type changer 422 and a code quality changer 424. The machine code replacement module 420 may replace the existing machine code version with another machine code version generated by a different processor. That is, the machine code replacement module 420 may replace a first version of machine code with a second version of machine code differing in terms of type or quality.

The machine code replacement module 420 may perform machine code replacement through on-stack replacement (OSR). OSR allows the virtual machine to interrupt running code during execution of a function/method, to re-optimize the function on-the-fly using an optimizing JIT compiler, and then to resume the interrupted function at the point and state where it was interrupted. For example, when a new machine code version is needed, owing to type inadequacy of the current machine code version, or when a new machine code version with a higher quality than the current machine code version is generated, the machine code replacement module 420 may replace the current machine code version with the new machine code version through OSR.

The code type changer 422 may replace a machine code version of a first type with another machine code version of a second type. For example, the code type determiner 412 may cause the first processor 301 to generate a machine code version of integer type for a dynamic language application, and the dynamic language execution module 430 may execute the integer-type machine code version. When a bailout occurs during execution (i.e., the integer-type machine code fails to continue execution), the code type changer 422 may replace the integer-type machine code version with another machine code version of a second type. The code type changer 422 may replace the integer-type machine code version with a machine code version of float type generated by the second processor 302 of FIG. 3, and the dynamic language execution module 430 may resume processing of the dynamic language application by executing the float-type machine code version.

The code quality changer 424 may replace a machine code version of a first quality with another machine code version of a second quality. For example, the code quality determiner 414 may cause the first processor 301 to generate a machine code version of a first quality (e.g., 25 percent optimization) for a dynamic language application, and cause the second processor 302 to generate a machine code version of a second quality (e.g., 50 percent optimization). Since the first-quality machine code version has a shorter compile time than the second-quality machine code version, the dynamic language execution system 400 may start processing of the dynamic language application by executing the first-quality machine code version. Thereafter, when the second processor 302 completes generation of the second-quality machine code version, the code quality changer 424 may replace the first-quality machine code version with the second-quality machine code version, and the dynamic language execution module 430 may continue processing of the dynamic language application by executing the second-quality machine code version.

The dynamic language execution module 430 may process dynamic language code using generated machine code. That is, the dynamic language execution module 430 may process dynamic language code by executing generated or replaced machine code versions, enabling the electronic device 101 or 201 to perform a function of an application, such as a web browser.

In various embodiments, the electronic device may include: a machine code assignment module; a machine code replacement module; a dynamic language execution module; processors electrically connected with the machine code assignment module, machine code replacement module, and dynamic language execution module; and a memory. Here, the memory may store instructions that are configured to, when executed for an application in a dynamic language, cause the electronic device to generate a first version of machine code using a first processor, to generate a second version of machine code using a second processor, to process the dynamic language application by executing the first machine code version immediately upon completion of the first machine code version, to replace the first machine code version with the second machine code version, and to execute the second machine code version so as to continue processing of the dynamic language application.

The dynamic language may be JavaScript.

The first machine code version may be of a first type, and the second machine code version may be of a second type different from the first type.

The first type or second type may be one of number type, string type, Boolean type, object type, and function type.

The memory may further store instructions that are configured to, for replacing the first machine code version with the second machine code version during execution, cause the electronic device to detect a compile error during execution using the first machine code version, to check whether the second machine code version enabling resumption of compilation is completed by the second processor, and to replace the first machine code version with the second machine code version upon completion of the second machine code version.

The first machine code version may be of a first quality, and the second machine code version may be of a second quality different from the first quality.

The quality of machine code may vary according to the level of code optimization, and a high-quality machine code version is highly optimized and has a longer translation time in comparison to a low-quality machine code version.

The second quality of the second machine code version may be higher than the first quality of the first machine code version.

The memory may further store instructions that are configured to, for replacing the first machine code version with the second machine code version during execution, cause the electronic device to check whether the second machine code version is completely generated by the second processor, and to replace the first machine code version with the second machine code version upon completion of the second machine code version.

Figure 5:
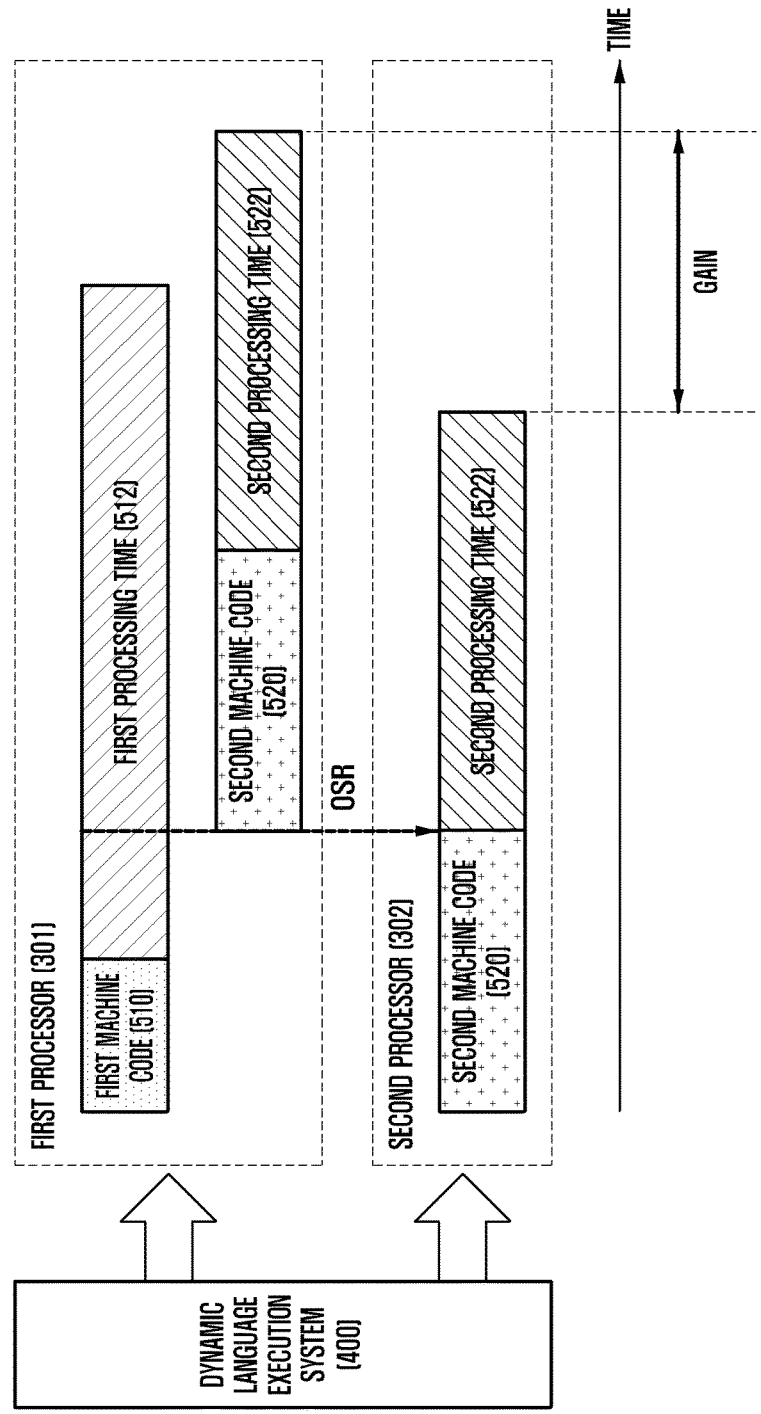
FIG. 5 is a diagram illustrating dynamic language execution by replacing different versions of machine code having different types, according to an embodiment of the present disclosure.

FIG. 5 is a diagram illustrating dynamic language translation by replacing different versions of machine code having different types, according to an embodiment of the present disclosure.

Referring to FIG. 5, for a dynamic language application, the dynamic language execution system 400 assigns a task of generating a first machine code version 510 to the first processor 301, and assigns a task of generating a second machine code version 520 to the second processor 302.

The dynamic language execution system 400 may process the dynamic language application by causing the first processor 301 to execute the first machine code version 510. During execution using the first machine code version 510, a bailout may occur (i.e., occurrence of a processing error owing to inadequacy of the result of type inference).

The dynamic language execution system 400 checks whether the second processor 302 has completed generation of the second machine code version 520. If the second machine code version 520 is completed, the dynamic language execution system 400 checks whether the second machine code version 520 has a type suitable for continued processing of the dynamic language application. The dynamic language execution system 400 replaces the first machine code version 510 with the second machine code version 520 through OSR and continues processing the dynamic language application.

The dynamic language execution system 400 may produce a gain in time through machine code replacement using OSR. For example, when a bailout occurs during execution of the first machine code version 510 using the first processor 301, resuming the execution immediately after the bailout using the second machine code version 520 prepared by the second processor 302 may be quicker than newly generating the second machine code version 520 using the first processor 301 after the bailout and resuming the execution. As shown in FIG. 5, dynamic language code can be processed more rapidly when two processors are used along with OSR, in comparison to when a single processor is used. The present disclosure is not limited to this two processor configuration. That is, the dynamic language execution system 400 may cause more than two processors (e.g. the third processor 303 and the fourth processor 304) to generate different versions of machine code with different types and apply OSR to the different versions of machine code. The processing time of the present disclosure refers to the period of time taken for processing a dynamic language application by using a particular machine code.

Figure 6:
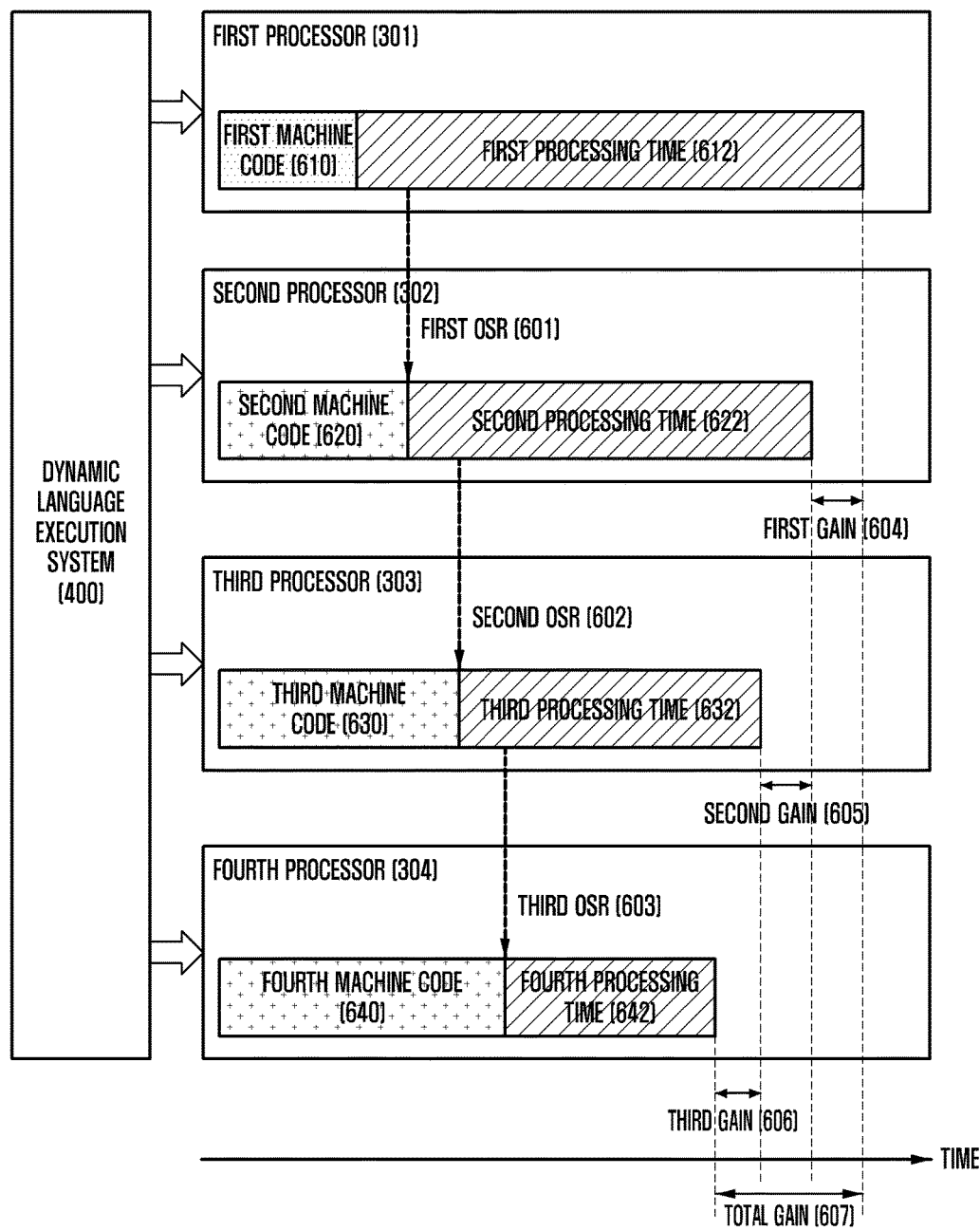
FIG. 6 is a diagram illustrating dynamic language execution by replacing different versions of machine code having different quality levels, according to an embodiment of the present disclosure.

FIG. 6 is a diagram illustrating dynamic language execution by replacing different versions of machine code having different quality levels, according to an embodiment of the present disclosure.

Referring to FIG. 6, for a dynamic language application, the dynamic language execution system 400 assigns a task of generating a first machine code version 610 to the first processor 301, assigns a task of generating a second machine code version 620 to the second processor 302, assigns a task of generating a third machine code version 630 to the third processor 303, and assigns a task of generating a fourth machine code version 640 to the fourth processor 304.

It can be assumed that the second machine code version 620 has a higher quality than the first machine code version 610, the third machine code version 630 has a higher quality than the second machine code version' 620, and the fourth machine code version 640 has a higher quality than the third machine code version 630. For example, the first machine code version 610 may have an optimization level of 20 percent, the second machine code version 620 may have an optimization level of 40 percent, the third machine code version 630 may have an optimization level of 60 percent, and the fourth machine code version 640 may have an optimization level of 80 percent. Since it generally takes more time to generate higher quality machine code, it may take the longest time for the fourth processor 304 to generate the fourth machine code version 640.

The dynamic language execution system 400 may process a dynamic language application by causing the first processor 301 to execute the first machine code version 610. When the second machine code version 620 is generated during execution of the first machine code version 610, the first machine code version 610 may be replaced with the second machine code version 620 through first OSR 601. Then, processing of the dynamic language code may be resumed at the point of interruption using the second machine code version 620. In this case, since the second machine code version 620 has a higher quality than the first machine code version 610, the second processing time 622 may be shorter than the remaining time of the first processing time 612. That is, the dynamic language execution system 400 may yield a first gain 604 by applying the first OSR 601.

The dynamic language execution system 400 may continue processing of the dynamic language application by executing the second machine code version 620 prepared by the second processor 302. When the third machine code version 630 is generated during execution of the second machine code version 620, the second machine code version 620 may be replaced with the third machine code version 630 through second OSR 602. Then, processing of the dynamic language code may be resumed at the point of interruption using the third machine code version 630. In this case, since the third machine code version 630 has a higher quality than the second machine code version 620, the third processing time 632 may be shorter than the remaining time of the second processing time 622. That is, the dynamic language execution system 400 may yield a second gain 605 by applying the second OSR 602.

The dynamic language execution system 400 may continue processing of the dynamic language application by executing the third machine code version 630 prepared by the third processor 302. When the fourth machine code version 640 is generated during execution of the third machine code version 630, the third machine code version 630 may be replaced with the fourth machine code version 640 through third OSR 603. Then, processing of the dynamic language code may be resumed at the point of interruption using the fourth machine code version 640. In this case, since the fourth machine code version 640 has a higher quality than the third machine code version 630, the fourth processing time 642 may be shorter than the remaining time of the third processing time 632. That is, the dynamic language execution system 400 may yield a third gain 606 by applying the third OSR 603. The processing time of the present disclosure refers to the period of time taken for processing a dynamic language application by using a particular machine code.

As described above, the dynamic language execution system 400 may yield a total gain 607 in time by applying OSR three times as indicated by the first OSR 601, the second OSR 602, and the third OSR 603. That is, it is possible to gradually speed-up the processing of dynamic language code by generating higher-quality versions of machine code using different processors. The present disclosure is not limited to the above example, and the number of processors and the quality level of machine code may be configured in various ways.

Figure 7:
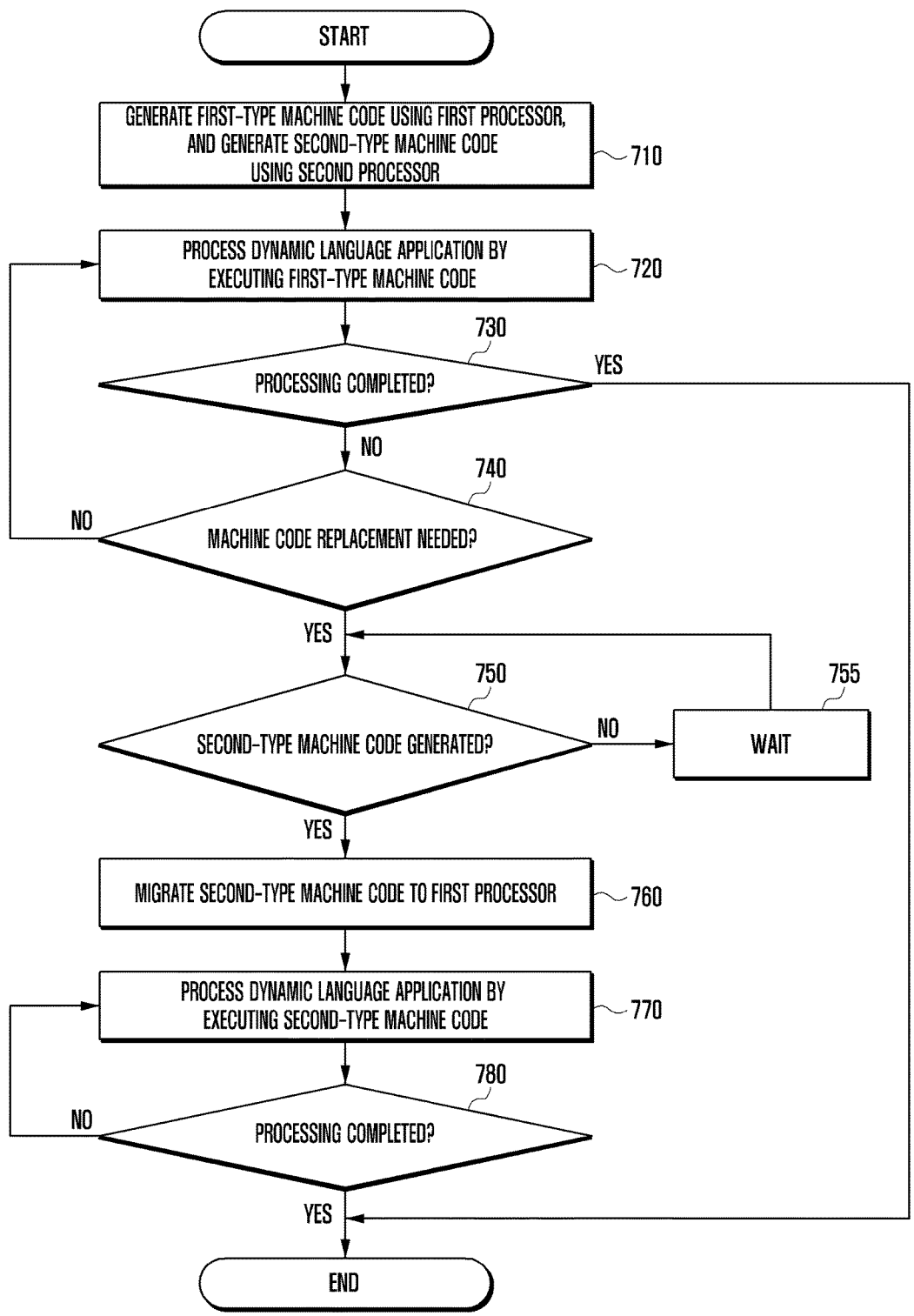
FIG. 7 is a flowchart illustrating dynamic language execution by replacing different versions of machine code having different types, according to an embodiment of the present disclosure.

FIG. 7 is a flowchart illustrating dynamic language execution by replacing different versions of machine code having different types, according to an embodiment of the present disclosure.

Referring to FIG. 7, in step 710, for a dynamic language application, the electronic device 101 or 201 assigns a task of generating a machine code version of a first type to the first processor, and assigns a task of generating a machine code version of a second type to the second processor.

In step 720, upon completion of the first-type machine code version, the electronic device starts processing the dynamic language application by executing the first-type machine code version.

In step 730, the electronic device determines whether processing of the dynamic language application is completed. If processing of the dynamic language application is completed, the procedure terminates.

If processing of the dynamic language application is not completed, the electronic device determines whether machine code replacement is necessary, in step 740.

If machine code replacement is not necessary, the procedure returns to step 720 where the electronic device continues to execute the first-type machine code version.

If machine code replacement is necessary, the electronic device determines whether the second-type machine code version is completely generated by the second processor, in step 750.

If the second-type machine code version is not completely generated, the electronic device waits for a given time. Thereafter, the procedure returns to step 750 where the electronic device checks completion of the second-type machine code version.

If the second-type machine code version is completely generated, the electronic device migrates the second-type machine code version to the first processor and replaces the first-type machine code version with the second-type machine code version, in step 760.

In step 770, the electronic device continues processing of the dynamic language application by executing the second-type machine code version.

In step 780, the electronic device checks whether processing of the dynamic language application is completed.

If processing of the dynamic language application is not completed, the procedure returns to step 770 where the electronic device continues processing of the dynamic language application. If processing of the dynamic language application is completed, the procedure terminates.

Embodiments of the present disclosure are not limited to or by the above-described flowchart of FIG. 7. For example, the electronic device 101 or 201 may have more than two processors and may cause the individual processors to generate different versions of machine code with different types (e.g., first to fourth types). Hence, necessity of machine code replacement may be examined for more than two different types to find a suitable type enabling compilation of the dynamic language code.

Further, instead of migrating the second-type machine code version to the first processor, in step 760, execution states and contexts of the code may be moved to the second processor and the second processor may execute the second-type machine code version for continued processing of the dynamic language code.

Figure 8:
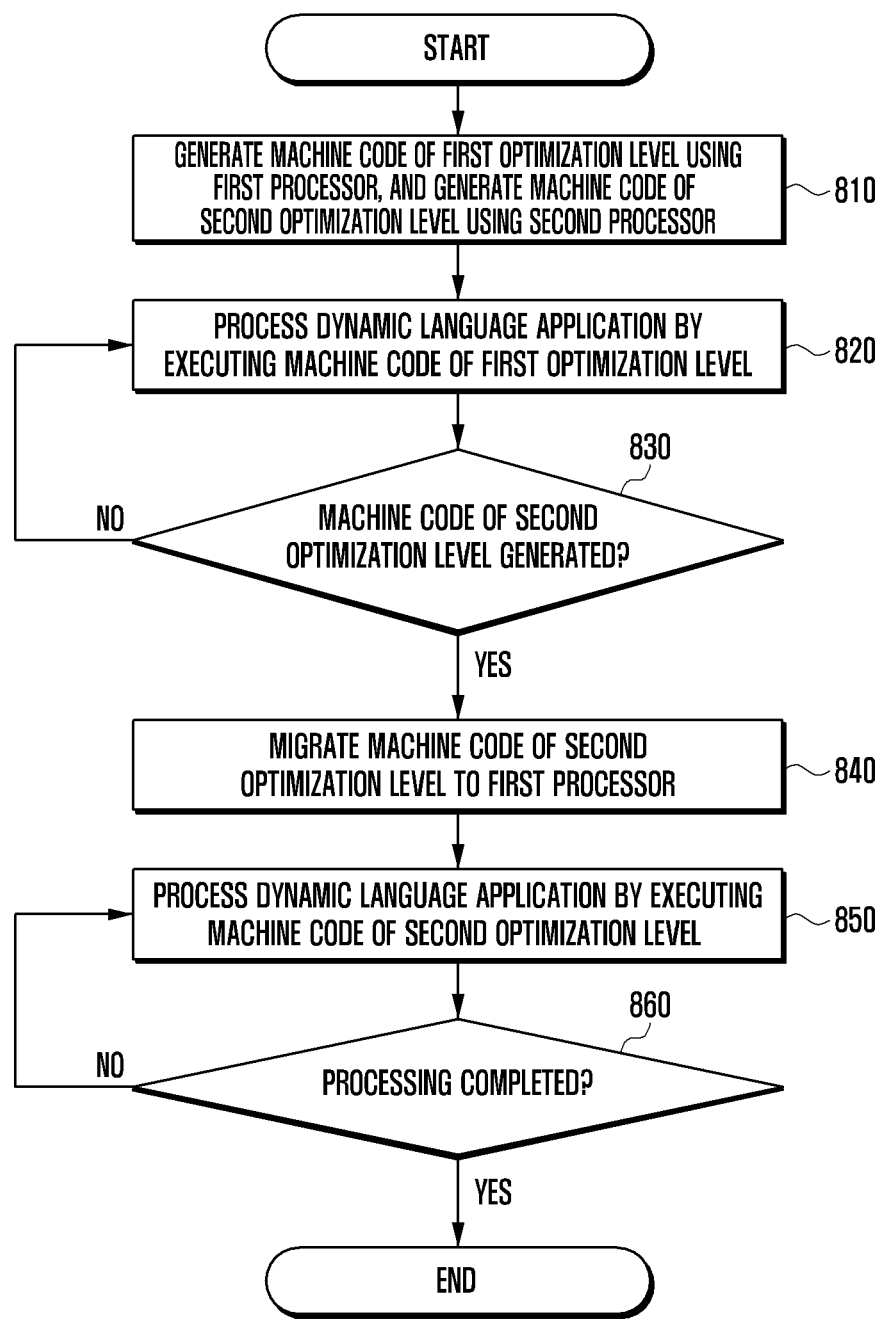
FIG. 8 is a flowchart illustrating dynamic language execution by replacing different versions of machine code having different quality levels, according to an embodiment of the present disclosure.

FIG. 8 is a flowchart illustrating dynamic language execution by replacing different versions of machine code having different quality levels, according to an embodiment of the present disclosure.

Referring to FIG. 8, in step 810, for a dynamic language application, the electronic device 101 or 201 assigns a task of generating a machine code version of a first quality to the first processor, and assigns a task of generating a machine code version of a second quality to the second processor.

In step 820, upon completion of the first-quality machine code version, the electronic device starts processing of the dynamic language application by executing the first-quality machine code version.

In step 830, the electronic device determines whether the second-quality machine code version is completely generated by the second processor.

If the second-quality machine code version is not completely generated, the procedure returns to step 820 where the electronic device continues execution of the first-quality machine code version.

If the second-quality machine code version is completely generated, the electronic device migrates the second-quality machine code version to the first processor and replaces the first-quality machine code version with the second-quality machine code version, in step 840.

In step 850, the electronic device continues processing of the dynamic language application by executing the second-quality machine code version.

In step 860, the electronic device determines whether processing of the dynamic language application is completed.

If processing of the dynamic language application is not completed, the procedure returns to step 850 where the electronic device continues processing of the dynamic language application. If processing of the dynamic language application is completed, the procedure terminates.

Embodiments of the present disclosure are not limited to or by the above-described flowchart of FIG. 8. For example, the electronic device 101 or 201 may have more than two processors and may cause the individual processors to generate different versions of machine code with different quality levels (e.g., first to fourth quality levels). Hence, machine code replacement may be examined for more than two different quality levels, so that the current machine code version is gradually replaced with a higher-quality machine code version.

Further, instead of migrating the second-quality machine code version to the first processor, in step 840, execution states and contexts of the code may be moved to the second processor and the second processor may execute the second-quality machine code version for continued processing of the dynamic language code.

According to various embodiments, a method of dynamic language processing for an electronic device may include: generating, for an application in a dynamic language, a first version of machine code using a first processor and generating a second version of machine code using a second processor; processing, upon completion of the first machine code version, the dynamic language application by executing the first machine code version; replacing the first machine code version with the second machine code version; and processing the dynamic language application by executing the second machine code version.

The dynamic language may be JavaScript.

The first machine code version may be inferred as having a first type, and the second machine code version may be inferred as having a second type different from the first type.

The first type or second type may be one of number type, string type, Boolean type, object type, and function type.

Replacing the first machine code version with the second machine code version may include: detecting a processing error during execution of the first machine code version; checking whether the second machine code version enabling resumption of application processing is completed by the second processor; and replacing the first machine code version with the second machine code version upon completion of the second machine code version.

The first machine code version may be of a first quality, and the second machine code version may be of a second quality different from the first quality.

The quality of machine code may vary according to the level of code optimization, and a high-quality machine code version is highly optimized and has a longer translation time in comparison to a low-quality machine code version.

The second quality of the second machine code version may be higher than the first quality of the first machine code version.

Replacing the first machine code version with the second machine code version may include: checking whether the second machine code version is completely generated by the second processor; and replacing the first machine code version with the second machine code version upon completion of the second machine code version.

Figure 9:
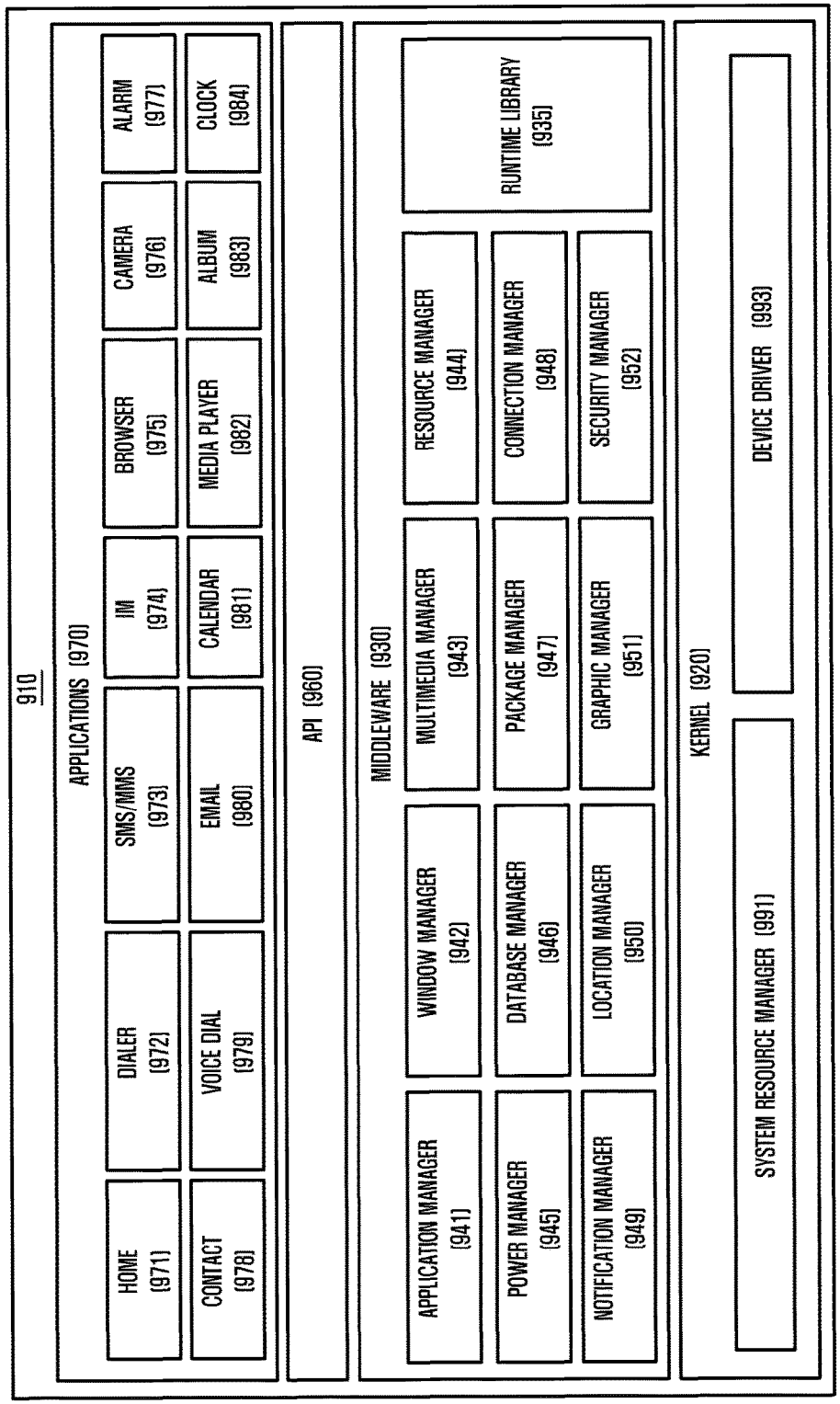
FIG. 9 is a block diagram illustrating a programming module, according an embodiment of the present disclosure.

FIG. 9 is a block diagram illustrating a configuration of a programming module, according to an embodiment of the present disclosure.

A programming module 900 may be included (or stored) in the electronic device 101 (e.g., the memory 130) of FIG. 1, or may be included (or stored) in the electronic device 200 (e.g., the memory 230) of FIG. 2. At least a part of the programming module 900 may be implemented in software, firmware, hardware, or a combination of two or more thereof. The programming module 900 may be implemented in hardware (e.g., the hardware 200 of FIG. 2), and may include an operating system (OS) controlling resources related to an electronic device (e.g., the electronic device 101 of FIG. 1) and/or various applications (e.g., an application 970) executed in the OS.

Referring to FIG. 9, the programming module 900 includes a kernel 910, a middleware 930, an API 960, and the application 970.

The kernel 910 (e.g., the kernel 131 of FIG. 1) includes a system resource manager 991 and a device driver 933. The system resource manager 991 may include, for example, a process manager, a memory manager, and a file system manager. The system resource manager 991 may perform the control, allocation, recovery, and/or the like of system resources. The device driver 933 may include, for example, a display driver, a camera driver, a Bluetooth driver, a shared memory driver, a USB driver, a keypad driver, a Wi-Fi driver, and/or an audio driver. Also, according to an embodiment of the present disclosure, the device driver 933 may include an inter-process communication (IPC) driver.

The middleware 930 may include multiple modules previously implemented so as to provide a function used in common by the applications 970. Also, the middleware 930 may provide a function to the applications 970 through the API 960 in order to enable the applications 970 to efficiently use limited system resources within the electronic device. For example, as illustrated in FIG. 9, the middleware 930 (e.g., the middleware 132 of FIG. 1) includes at least one of a runtime library 935, an application manager 941, a window manager 942, a multimedia manager 943, a resource manager 944, a power manager 945, a database manager 946, a package manager 947, a connectivity manager 948, a notification manager 949, a location manager 950, a graphic manager 951, a security manager 952, and any other suitable and/or similar manager.

The runtime library 935 may include, for example, a library module used by a compiler, in order to add a new function by using a programming language during the execution of the application 970. According to an embodiment of the present disclosure, the runtime library 935 may perform functions that are related to input and output, the management of a memory, an arithmetic function, and/or the like.

The application manager 941 may manage, for example, a life cycle of at least one of the applications 970. The window manager 942 may manage GUI resources used on the screen. The multimedia manager 943 may detect a format used to reproduce various media files and may encode or decode a media file through a codec appropriate for the relevant format. The resource manager 944 may manage resources, such as a source code, a memory, a storage space, and/or the like of at least one of the applications 970.

The power manager 945 may operate together with a basic input/output system (BIOS), may manage a battery or power, and may provide power information and the like used for an operation. The database manager 946 may manage a database in such a manner as to enable the generation, search and/or change of the database to be used by at least one of the applications 970. The package manager 947 may manage the installation and/or update of an application distributed in the form of a package file.

The connectivity manager 948 may manage a wireless connectivity such as, for example, Wi-Fi and Bluetooth. The notification manager 949 may display or report, to the user, an event such as an arrival message, an appointment, a proximity alarm, and the like in such a manner as not to disturb the user. The location manager 950 may manage location information of the electronic device. The graphic manager 951 may manage a graphic effect, which is to be provided to the user, and/or a user interface related to the graphic effect. The security manager 952 may provide various security functions used for system security, user authentication, and the like. According to an embodiment of the present disclosure, when the electronic device (e.g., the electronic device 101) has a telephone function, the middleware 930 may further include a telephony manager for managing a voice telephony call function and/or a video telephony call function of the electronic device.

The middleware 930 may generate and use a new middleware module through various functional combinations of the above-described internal element modules. The middleware 930 may provide modules specialized according to types of OSs in order to provide differentiated functions. Also, the middleware 930 may dynamically delete some of the existing elements, or may add new elements. Accordingly, the middleware 930 may omit some of the elements described in the various embodiments of the present disclosure, may further include other elements, or may replace the some of the elements with elements, each of which performs a similar function and has a different name.

The API 960 (e.g., the API 133 of FIG. 1) is a set of API programming functions, and may be provided with a different configuration according to an OS. For example, one API set may be provided to each platform, or two or more API sets may be provided to each platform.

The applications 970 (e.g., the applications 134 of FIG. 1) may include, for example, a preloaded application and/or a third party application. The applications 970 (e.g., the applications 134 of FIG. 1) include, for example, a home application 971, a dialer application 972, a short message service (SMS)/multimedia message service (MMS) application 973, an instant message (IM) application 974, a browser application 975, a camera application 976, an alarm application 977, a contact application 978, a voice dial application 979, an electronic mail (e-mail) application 980, a calendar application 981, a media player application 982, an album application 983, a clock application 984, and any other suitable and/or similar application.

At least a part of the programming module 900 may be implemented by instructions stored in a non-transitory computer-readable storage medium. When the instructions are executed by one or more processors (e.g., the one or more processors 210), the one or more processors may perform functions corresponding to the instructions. The non-transitory computer-readable storage medium may be, for example, the memory 220. At least a part of the programming module 900 may be implemented (e.g., executed) by, for example, the one or more processors 210. At least a part of the programming module 900 may include, for example, a module, a program, a routine, a set of instructions, and/or a process for performing one or more functions.

Examples of computer-readable media include: magnetic media, such as hard disks, floppy disks, and magnetic tape; optical media such as compact disc-ROMs (CD-ROMs) and DVDs; magneto-optical media, such as floptical disks; and hardware devices that are specially configured to store and perform program instructions (e.g., programming modules), such as ROM, RAM, flash memory, etc. Examples of program instructions include machine code instructions created by assembly languages, such as a compiler, and code instructions created by a high-level programming language executable in computers using an interpreter, etc. The described hardware devices may be configured to act as one or more software modules in order to perform the operations and methods described above, or vice versa.

Modules or programming modules, according to the embodiments of the present disclosure, may include one or more components. The operations performed by modules, programming modules, or the other components, according to embodiments of the present disclosure, may be executed in a serial, parallel, repetitive, or heuristic fashion. Part of the operations can be executed in any other order, skipped, or executed with additional operations.

Although the disclosure has been shown and described with reference to certain embodiments thereof, it will be understood by those skilled in the art that various changes in form and detail may be made therein without departing from the spirit and scope of the disclosure as defined by the appended claims.

What is claimed is:

1. A method for processing a dynamic language application in an electronic device including a first processor and a second processor, the method comprising:
   generating, for the dynamic language application, a first machine code by compiling a dynamic language source code through the first processor and a second machine code by compiling the same dynamic language source code through the second processor;
   processing the dynamic language source code by using the first machine code;
   replacing the first machine code with the second machine code; and
   processing, after replacing the first machine code by the second machine code, the dynamic language source code continuously by using the second machine code,
   wherein the first machine code is of a first quality, and the second machine code is of a second quality that is higher than the first quality, and
   wherein a quality of a machine code varies according to a level of code optimization, and a high-quality machine code is highly optimized and has a longer translation time in comparison to a low-quality machine code.

2. The method of claim 1, wherein the first machine code is of a first type, the second machine code is of a second type, and the second type is different from the first type.

3. The method of claim 2, wherein the first type and the second type are one of a number type, a string type, a Boolean type, an object type, and a function type.

4. The method of claim 1, wherein replacing the first machine code with the second machine code comprises:
   detecting a processing error during execution of the first machine code;
   determining whether generation of the second machine code is completed by the second processor; and
   replacing the first machine code with the second machine code when generation of the second machine code is completed.

5. The method of claim 1, wherein replacing the first machine code with the second machine code comprises:
   determining whether the second machine code is generated by the second processor; and
   replacing the first machine code with the second machine code, when the second machine code is generated.

6. An electronic device comprising:
   a machine code assignment module;
   a machine code replacement module;
   a dynamic language execution module;
   a plurality of processors including a first processor and a second processor electrically connected with the machine code assignment module, the machine code replacement module, and the dynamic language execution module; and
   a memory,
   wherein the memory stores instructions that are configured to, when executed for a dynamic language application, cause the electronic device to:
      generate a first machine code by compiling a dynamic language source code through the first processor of the plurality of processors;
      generate a second machine code by compiling the same dynamic language source code through the second processor of the plurality of processors;
      process the dynamic language source code by using the first machine code;
      replace the first machine code with the second machine code; and
      process, after replacing the first machine code by the second machine code, the dynamic language source code continuously by using the second machine code,
   wherein the first machine code is of a first quality, and the second machine code is of a second quality that is higher than the first quality, and
   wherein a quality of a machine code varies according to a level of code optimization, and a high-quality machine code is highly optimized and has a longer translation time in comparison to a low-quality machine code.

7. The electronic device of claim 6, wherein the first machine code is of a first type, the second machine code is of a second type, and the second type is different from the first type.

8. The electronic device of claim 7, wherein the first type and the second type are one of a number type, a string type, a Boolean type, an object type, and a function type.

9. The electronic device of claim 6, wherein replacing the first machine code with the second machine code comprises:
   detecting a processing error during execution using the first machine code;
   determining whether generation of the second machine code is completed by the second processor; and
   replacing the first machine code with the second machine code when generation of the second machine code is completed.

10. The electronic device of claim 6, wherein replacing the first machine code with the second machine code comprises:
   determining whether the second machine code is generated by the second processor; and
   replacing the first machine code with the second machine code when the second machine code is generated.

* * * * *